United States Patent Office.

HEINRICH HAMPEL, OF NEUSIEDL, AND VICTOR ZAMPIS, OF VIENNA, AUSTRIA-HUNGARY.

PREPARATION OF ROSIN-SOAP.

SPECIFICATION forming part of Letters Patent No. 621,777, dated March 21, 1899.

Application filed September 30, 1898. Serial No. 692,329. (No specimens.)

*To all whom it may concern:*

Be it known that we, HEINRICH HAMPEL, a subject of the Emperor of Germany, residing at Neusiedl, near Vienna, and VICTOR ZAMPIS, a subject of the Emperor of Austria-Hungary, residing at Vienna, Empire of Austria-Hungary, have invented certain new and useful Improvements in the Preparation of Rosin-Soap; and we do hereby declare the following to be a full, clear, and exact description of the invention, such as will enable others skilled in the art to which it appertains to make and use the same.

Our invention consists in the preparation of rosin-soap so as to permit a sure and faultless sizing of the paper in the beating-engine, the method of which preparation is as follows: The crushed rosin, which has been mixed in a dry state with a small quantity (three per cent.) of soda-ash, is dissolved in water, employing a very small quantity of direct steam, a low temperature, (80° to 100° centigrade,) and no steam-pressure, while during the whole operation the rosin is continually stirred up. To the rosin thus reduced to a liquid state in mixture a further quantity of soda-ash (carbonate of soda, six to seven per cent., according to the chemical composition of the working water) is added in a dry state by continual mechanical stirring without any further addition of steam. This addition of dry soda-ash serves to prevent the hardening of the liquid mixture and fit it for conversion into sizing-milk by adding hot water as needed. By dissolving the rosin in this way only a part of the rosin is converted into a soap, while the other part goes into suspension in a free state, and at the same time its sizing power—*i. e.*, its water-repelling property—is conserved.

The necessary solubility in water is given to the rosin by the addition of carbonate of soda, as above, whereby in our method, employing no more steam or pressure and a low temperature, the largest admissible percentage of free rosin is obtained, while, on the other hand, the sizing power of the rosin, which is very sensitive to high temperatures, is conserved.

It has been hitherto generally regarded as impracticable to obtain in a good soap the above-mentioned excess of free rosin and its advantages for sizing. The methods hitherto employed have required with such excess of rosin a great quantity of diluting liquid at the time of transformation into sizing-milk, or if only a moderate amount of the diluting liquid be employed the free rosin, exceeding what can be kept in suspension in the solution of resinate of soda, is deposited as a precipitate, involving a considerable loss of material besides the danger of rosin specks in the paper and the inconvenience of having the pipes, filters, and utensils encumbered with glutinous matter.

As in our method of dissolving the rosin there are only small quantities of water employed, and as the crushed rosin is added as a dry mixture with soda-ash, and as, furthermore, there is very little steam used the required continual stirring can hardly be well done by hand and would require a larger and damaging use of steam. Therefore, though it is not strictly necessary, a mechanical mixer is preferable. The mixture and dissolving action are made quicker and more regular by this means with less steam at a lower temperature, which, as already mentioned, conserves the sizing property of the rosin.

Having thus described our invention, what we claim, and desire to secure by Letters Patent, is—

The process of manufacturing rosin-soap, consisting in the following steps: first, mixing the dry rosin with about three per cent. of soda-ash and reducing this mixture to a liquid form by stirring it into a small quantity of water and steam, at a temperature of about 80° to 100° centigrade, and secondly, stirring into the liquid thus produced about six or seven per cent. of dry soda-ash to prevent it from hardening and fit it for making sizing-milk by the addition of hot water, substantially as set forth.

In testimony whereof we affix our signatures in presence of two witnesses.

HEINRICH HAMPEL.
VICTOR ZAMPIS.

Witnesses:
HENRY C. CARPENTER,
JOHN P. OPPENHEIM.